Jan. 7, 1964
W. R. NORTHOVER ETAL
3,117,013
GLASS COMPOSITION
Filed Nov. 6, 1961
3 Sheets-Sheet 1
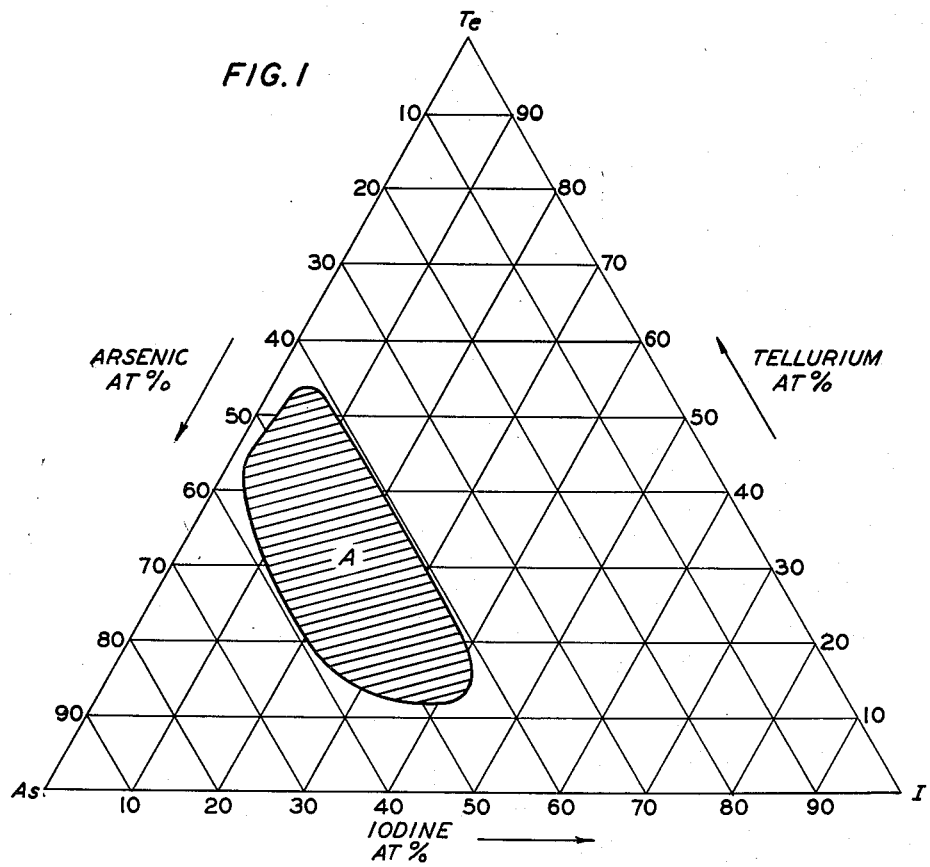
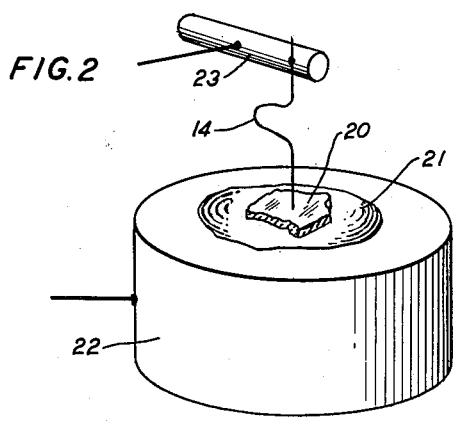
INVENTORS W. R. NORTHOVER
A. D. PEARSON
BY
ATTORNEY

INVENTORS W. R. NORTHOVER
A. D. PEARSON

INVENTORS W. R. NORTHOVER
A. D. PEARSON
BY
ATTORNEY

United States Patent Office 3,117,013
Patented Jan. 7, 1964

3,117,013
GLASS COMPOSITION
William R. Northover, Westfield, and Arthur D. Pearson, Bernardsville, N.J., assignors to Bell Telephone Laboratories, Incorporated, New York, N.Y., a corporation of New York
Filed Nov. 6, 1961, Ser. No. 150,483
2 Claims. (Cl. 106—47)

This invention relates to novel glass compositions which have been found to exhibit unexpected and useful electrical characteristics.

The novel compositions of this invention are glassy single-phase materials within the ternary system arsenic-tellurium-iodine. These glasses have been found to exhibit extremely significant and unexpected electrical properties. The discovery of useful electrical phenomena in glasses of this character forms a basis for the invention in copending application Serial No. 150,374, filed November 6, 1961. Various other useful areas of application for the novel compositions of this invention will become apparent to those skilled in the art. For instance, the conductivity values of these materials suggest their use as resistance elements. Additionally, these glasses can be effectively used as selective light filters, the transmission being in the infrared.

The specific compositions within this ternary system which form glasses contain the indicated components in the following ranges:

As _____ 41 atomic percent–58 atomic percent.
Te _____ 12 atomic percent–53 atomic percent.
I _____ 4 atomic percent–41 atomic percent.

For a more appropriate representation of the compositions of this invention reference is made to the drawing in which:

FIG. 1 is a ternary diagram of the system As-Te-I showing the glass forming compositions within the shaded area A;

FIG. 2 is a perspective view of an electrical element constructed of a composition of this invention;

FIG. 1 shows the phase diagram for the novel system of this invention indicating the glass-forming compositions in the shaded area A. To obtain this diagram, samples were prepared by the following technique.

Figure 3:
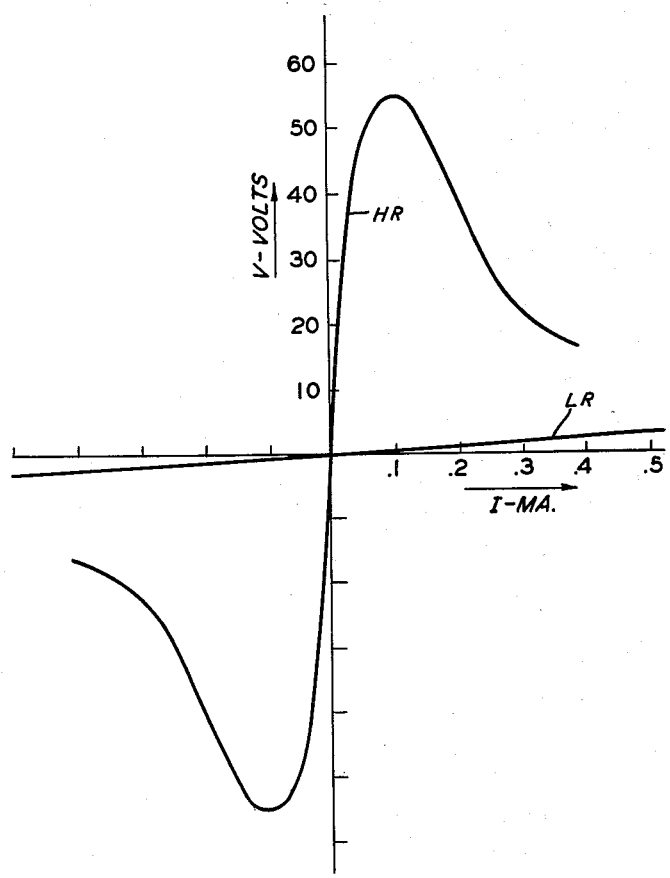
FIG. 3 is a current-voltage plot of the element of FIG. 2 having the composition 53% As, 43% Te, 4% I.

Starting materials for the preparation of these glasses consisted of high purity metallic arsenic and tellurium and resublimed crystalline iodine. Samples were prepared in clear fused quartz vials having the approximate dimensions of 5/16" I.D. x 6" long. The weights of the elements required to form a product of a given composition were calculated so that after reaction the product would just fill a bulb at the bottom of the vial. The required quantities of arsenic, tellurium, and iodine were weighed out in a dry nitrogen atmosphere and transferred to the quartz vial. The vial was then evacuated and sealed with a hydrogen torch. The sealed quartz vial was then placed inside a steel bomb with loosely fitting but securely fixed end caps. The bomb was then heated at 600° C. for one hour in a horizontal furnace having a combustion tube which rotated about its own axis during the firing. After the reaction, the bomb and its contents were allowed to cool in a vertical position so that the majority of the products would solidify in the bulb at the bottom of the vial. After cooling, the vial was removed from the steel bomb and small quantities of materials which had condensed in the upper portion of the tube were forced down into the bulb by heating the tube with a hydrogen torch. The tube was heated with a small hydrogen flame at a point just above the bulb until it collapsed and sealed. The tube above the collapsed portion was then drawn off and the section of the vial containing the product was then reheated in the steel bomb for a further hour at 600° C. in the rotating tube furnace. After firing, the bomb and its contents were allowed to air-cool to room temperature.

This sealed vial preparation technique avoids loss of iodine by volatilization and ensures a product of composition corresponding to the weights of the reactants used. Variations in composition between the surface of the product and its bulk were minimized by making sure that the volume of the final product would as nearly as possible fill the quartz bulb, thus allowing only a very small free volume into which evaporation of volatile constituents could take place.

The necessary quantities of each constituent for this reaction are determined by the proportions desired in the final composition.

For the construction of the phase diagram of the system, arsenic-tellurium-iodine, samples of varying composition were prepared by the method outlined above. The samples were removed from the quartz vials and classified as glasses or nonglasses by means of the following considerations.

(1) Existence of only one phase.
(2) Gradual softening and then melting as temperature was increased, rather than the sharp melting points characteristic of crystalline materials.
(3) Conchoidal fracture.
(4) Absence of crystalline X ray diffraction peaks.

The phase diagram was then drawn up, ploting the individual compositions in terms of the atomic percentages of the constituents present. As can readily be seen, at no point does the area of stable glass formation extend to the edges of the system.

The glasses in this new system are semiconductors, that is, they have electron conductivities within the range $10^{-8}$ ohm$^{-1}$ cm.$^{-1}$ to $10^{-2}$ ohm$^{-1}$ cm.$^{-1}$. They vary from black materials having low electrical conductivities at high iodine concentration to silvery materials with high electrical conductivities at low concentrations of iodine.

The electrical properties of these glasses were investigated in terms of their voltage-current characteristics by making a point contact to one side of the glass fragment, while contact to the other side of the sample was made by means of a pool of liquid indium-gallium alloy.

The electrical characteristics of samples prepared in accordance with the above description were measured using the means illustrated in FIG. 2. FIG. 2 shows the glass sample 20 resting in a pool of indium-gallium alloy 21 atop a brass base member 22. The alloy pool was used to ensure proper contact between the base member and the sample. A conductive pin 23 holds the point contact 24 in contact with the glass sample. The point contact was a 5 mil tungsten wire having a hemispherical point on a reduced portion with a diameter of 0.5 mil. The point contact may alternatively be platinum or phosphorus-bronze or any conductive, high-melting metal. Although the data presented was obtained using point contacts, completely similar effects have been observed with broad-area contacts. If a broad-area contact is desired, evaporated gold contacts or indium dots may be used which are conventional in the art. For experimental purposes a wire immersed in a drop of indium-gallium alloy placed atop the sample provided an adequate broad-area contact of the order of 60 mils diameter.

Figure 4:
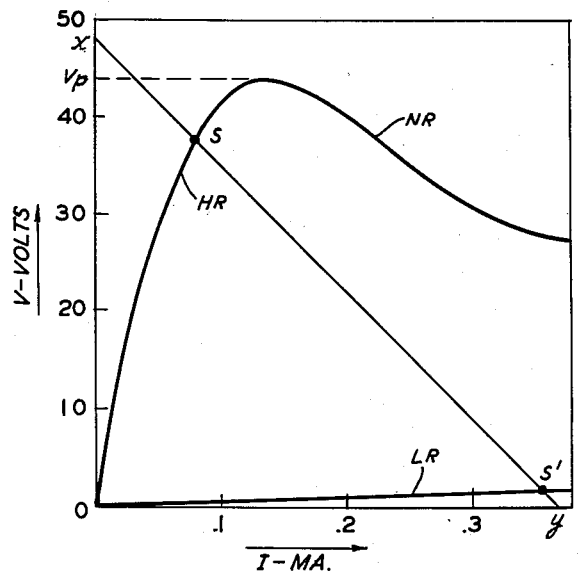
FIG. 4 is a current voltage plot of an element similar to that of FIG. 2 having the composition 46% As, 16% Te, 38% I.
Figure 5:
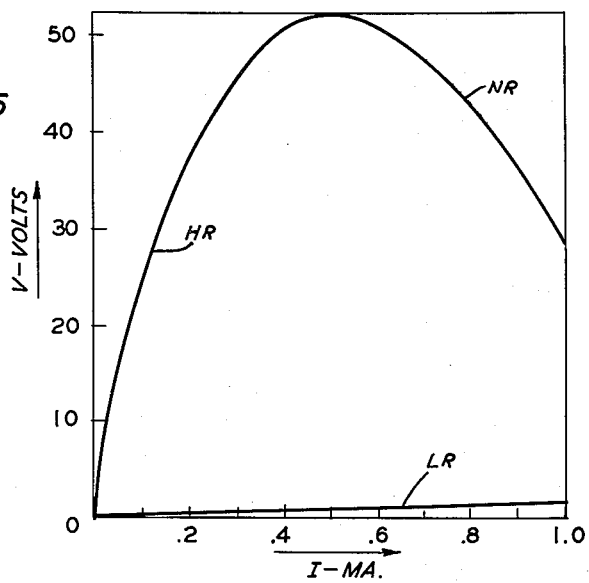
FIG. 5 is a current voltage plot of an element similar to that of FIG. 2 having the composition 43% As, 28% Te, 29% I.

The data obtained from these electrical investigations is presented in FIGS. 3–5. Each of these figures is a current voltage plot of an exemplary composition within the glass system of this invention. The specific compositions used to obtain the characteristics of the respective figures are:

FIG. 3: 53% As, 43% Te, 4% I
FIG. 4: 46% As, 16% Te, 38% I
FIG. 5: 43% As, 28% Te, 29% I

FIG. 3 illustrates the symmetry of the characteristics showing the values obtained with reverse currents. All of the glasses within the system of this invention exhibited this symmetrical characteristic.

Each of the figures shows three significant resistance characteristics: a low resistance curve designated "LR," a high resistance portion designated "HR," and a negative-resistance region designated "NR." The presence of these resistance states will suggest various device applications. Since this multistable characteristic, possessed of symmetrical behavior, is relatively unique in the art, it is expected that new and novel devices will be made possible which make use of the unexpected electrical properties characteristic of the materials of the invention. For instance, the symmetrical characteristic gives promise of symmetrical switching devices.

Many of the current active electrical devices, such as switches, oscillators, amplifiers, memory elements, et cetera, can be constructed with the materials of this invention. These device applications are set forth in detail in copending application Serial No. 150,374, filed November 6, 1961.

As exemplary of these devices, a bistable switch may be constructed as in FIG. 2. Referring to FIG. 4, the initial operating point along power line $x$—$y$ is point S. Upon applying a voltage pulse in excess of the peak voltage, $V_p$, the diode switches to point S'.

As will be apparent to those skilled in the art, various additional materials may be added to glassy materials without materially altering the basic character of the glass. Fillers and stabilizers are common additives in this category.

What is claimed is:

1. A glass having a composition within the shaded area A of FIG. 1 of the drawing.

2. The composition of claim 1 having an electron conductivity within the range $10^{-8}$ ohm$^{-1}$ cm.$^{-1}$ to $10^{-2}$ ohm$^{-1}$ cm.$^{-1}$.

References Cited in the file of this patent

UNITED STATES PATENTS

| | | |
|---|---|---|
| 2,883,292 | Jerger | Apr. 21, 1959 |
| 2,883,293 | Jerger et al. | Apr. 21, 1959 |
| 3,024,119 | Flaschen et al. | Mar. 6, 1962 |